(12) United States Patent
Sato et al.

(10) Patent No.: US 12,129,137 B2
(45) Date of Patent: Oct. 29, 2024

(54) WEBBING WINDING DEVICE

(71) Applicant: KABUSHIKI KAISHA TOKAI-RIKA-DENKI-SEISAKUSHO, Aichi (JP)

(72) Inventors: Takamasa Sato, Aichi (JP); Motoki Sugiyama, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 207 days.

(21) Appl. No.: 17/909,305

(22) PCT Filed: Mar. 18, 2021

(86) PCT No.: PCT/JP2021/011145
§ 371 (c)(1),
(2) Date: Sep. 2, 2022

(87) PCT Pub. No.: WO2021/193366
PCT Pub. Date: Sep. 30, 2021

(65) Prior Publication Data
US 2023/0086721 A1 Mar. 23, 2023

(30) Foreign Application Priority Data
Mar. 24, 2020 (JP) .................. 2020-053432

(51) Int. Cl.
*B60R 22/44* (2006.01)
*B60R 22/34* (2006.01)
*B65H 18/10* (2006.01)

(52) U.S. Cl.
CPC ............. *B65H 18/10* (2013.01); *B60R 22/34* (2013.01); *B60R 22/44* (2013.01); *B65H 2403/72* (2013.01); *B65H 2403/80* (2013.01)

(58) Field of Classification Search
CPC ......... B60R 22/34; B60R 22/44; B60R 22/46; B60R 22/48; B60R 2022/468; B60R 2022/4666
See application file for complete search history.

(56) References Cited

U.S. PATENT DOCUMENTS

| | | | | |
|---|---|---|---|---|
| 7,533,842 | B2* | 5/2009 | Saito | B60R 22/44 |
| | | | | 242/390.8 |
| 10,000,184 | B2* | 6/2018 | Nagata | B60R 22/46 |
| 2007/0051841 | A1 | 3/2007 | Mori | |
| 2016/0347277 | A1 | 12/2016 | Nagata et al. | |
| 2017/0341626 | A1* | 11/2017 | Nagata | B60R 22/48 |
| 2017/0369030 | A1* | 12/2017 | Osaki | B60R 22/44 |
| 2018/0009410 | A1* | 1/2018 | Umakoshi | B60R 22/34 |
| 2018/0009411 | A1* | 1/2018 | Umakoshi | B60R 22/405 |

FOREIGN PATENT DOCUMENTS

| | | |
|---|---|---|
| CN | 1927627 A | 3/2007 |
| JP | 2016-222005 A | 12/2016 |

\* cited by examiner

*Primary Examiner* — Sang K Kim
(74) *Attorney, Agent, or Firm* — Studebaker & Brackett PC

(57) ABSTRACT

In the webbing winding device, the rotation of the output shaft of the motor is transmitted to the spool via the first gear train. In this state, when the rotation speed of the spool decreases and the rotation of the slider base of the first clutch decreases, the coupling pawl of the second clutch is pressed by the slider provided on the slider base to mesh with the ratchet gear, and the rotation of the output shaft of the motor is transmitted to the spool via the second gear train.

3 Claims, 7 Drawing Sheets

WEBBING WINDING DEVICE

TECHNICAL FIELD

The present invention relates to a webbing winding device constituting a seat belt device of a vehicle.

BACKGROUND ART

For example, in a webbing winding device disclosed in Japanese Patent Application Laid-Open (JP-A) No. 2016-222005, two transmission paths of rotation from an output shaft of a motor to a spool are provided. These transmission paths have different reduction ratios. That is, the transmission path of one system has a large reduction ratio, and the rotation speed of the spool in the winding direction is low. On the other hand, the transmission path of the other system has a small reduction ratio and a high rotation speed of the spool.

In the configuration disclosed in JP-A No. 2016-222005, when the motor is driven to rotate forward, the rotation (forward rotation) of the output shaft of the motor is transmitted to the spool through the transmission path of one system, and the spool is rotated in the winding direction. On the other hand, when the motor is reversely driven, the rotation (reverse rotation) of the output shaft of the motor is transmitted to the spool through the transmission path of the other system, and the spool is rotated in the winding direction. As described above, the rotation direction of the output shaft of the motor is required to be changed between a case in which the rotation of the output shaft of the motor is transmitted to the spool through the transmission path of one system and a case in which the rotation of the output shaft of the motor is transmitted to the spool through the transmission path of the other system. Therefore, it is difficult to control the motor.

SUMMARY OF INVENTION

Technical Problem

In view of the above fact, an object of the present invention is to obtain a webbing winding device in which a motor is easily controlled.

Solution to Problem

A webbing winding device according to a first aspect of the present invention includes a spool to which a longitudinal proximal end of a long belt-shaped webbing is locked and which winds the webbing from a longitudinal proximal end side of the webbing by rotation in a winding direction, a drive unit that is driven to rotate an output shaft, a first rotation transmission unit that is coupled to the output shaft, receives input of rotation of the output shaft, transmits the rotation of the output shaft in a predetermined direction to a spool in a state where the rotation is allowed to be transmitted to the spool, and rotates the spool in a winding direction, a second rotation transmission unit that is coupled to the output shaft, receives input of rotation of the output shaft, sets a reduction ratio of rotation of the output shaft from the output shaft to the spool to be larger than a reduction ratio of the first rotation transmission unit, transmits the rotation of the output shaft to the spool in a state where the rotation is allowed to be transmitted to the spool, and rotates the spool in a winding direction, and a switching unit that switches a transmission path of rotation from the output shaft to the spool from the first rotation transmission unit to the second rotation transmission unit when a rotation speed of the spool due to transmission of rotation via the first rotation transmission unit is lower than a rotation speed of the spool due to transmission of rotation via the second rotation transmission unit.

In the webbing winding device according to the first aspect of the invention, when the drive unit is driven, the output shaft of the drive unit is rotated in a predetermined direction. The output shaft of the drive unit is coupled to the first rotation transmission unit, and when the rotation is allowed to be transmitted from the first rotation transmission unit to the spool, rotation of the output shaft of the drive unit is transmitted to the spool via the first rotation transmission unit, and the spool is rotated in the winding direction. As a result, the webbing is wound around the spool.

The output shaft of the drive unit is coupled to the second rotation transmission unit, and rotation of the output shaft of the drive unit in the predetermined direction is transmitted to the second rotation transmission unit. When the rotation is allowed to be transmitted from the second rotation transmission unit to the spool, rotation of the output shaft of the drive unit in the predetermined direction is transmitted to the spool, and the spool is rotated in the winding direction.

In a state in which the rotation of the output shaft of the drive unit in the predetermined direction is transmitted to the spool via the first rotation transmission unit, when the rotation speed of the spool in the winding direction is lower than the rotation speed of the spool in the winding direction when the rotation is transmitted to the spool via the second rotation transmission unit the switching unit switches the transmission path of the rotation from the output shaft of the drive unit to the spool from the first rotation transmission unit to the second rotation transmission unit. As a result, the rotation of the output shaft of the drive unit is transmitted to the spool via the second rotation transmission unit, and the spool is rotated in the winding direction.

Here, the reduction ratio of the second rotation transmission unit from the output shaft of the drive unit to the spool is larger than the reduction ratio of the first rotation transmission unit from the output shaft of the drive unit to the spool. Therefore, when the transmission path of the rotation from the output shaft of the drive unit to the spool is switched from the first rotation transmission unit to the second rotation transmission unit by the switching unit, the rotational torque when the spool is rotated in the winding direction can be increased.

In a webbing winding device according to a second aspect of the invention in the webbing winding device according to the first aspect of the invention, the switching unit includes a first clutch that transmits rotation of the output shaft in a predetermined direction transmitted to the first rotation transmission unit to the spool and is actuated to block transmission of the rotation from the first rotation transmission unit to the spool, and a second clutch that blocks transmission of rotation from the second rotation transmission unit to the spool, is actuated, when a rotation speed of the spool due to transmission of rotation via the first rotation transmission unit is lower than a rotation speed of the spool due to transmission of rotation via the second rotation transmission unit, to connect the second rotation transmission unit to the spool, transmits rotation of the output shaft in the predetermined direction to the spool via the second rotation transmission unit, and further actuates the first clutch.

In the webbing winding device according to the second aspect of the invention, when the drive unit is driven and the output shaft of the drive unit is rotated in a predetermined direction, the rotation of the output shaft is transmitted to both the first rotation transmission unit and the second rotation transmission unit.

The rotation of the output shaft transmitted to the first rotation transmission unit is transmitted to the spool by the first clutch, whereby the spool is rotated in the winding direction. In this state, when the rotation speed of the spool in the winding direction is lower than the rotation speed of the spool in the winding direction when the rotation is transmitted to the spool via the second rotation transmission unit, the second clutch is actuated. As a result, the rotation of the output shaft transmitted to the second rotation transmission unit is transmitted to the spool, whereby the spool is rotated in the winding direction.

In addition, the first clutch is actuated by actuating the second clutch. As a result, transmission of rotation from the first rotation transmission unit to the spool is blocked.

A webbing winding device according to a third aspect of the invention in the webbing winding device according to the second aspect of the invention, the first clutch includes a first rotating body rotated by rotation of the output shaft in the predetermined direction, and wherein the second clutch includes a second rotating body that is rotated coaxially with the first rotating body at a rotation speed equal to or lower than a rotation speed of the first rotating body by rotation of the output shaft in the predetermined direction and a coupling member that is provided on the second rotating body and causes, by a movement of the coupling member, a state where rotation of the second rotating body is allowed to be transmitted to the spool to occur and wherein the webbing winding device includes a pressing member that is provided on the first rotating body so as to be rotatable together with the first rotating body, and presses the coupling member to move the coupling member when a rotation speed of the second rotating body exceeds a rotation speed of the first rotating body.

In the webbing winding device according to the third aspect of the invention, when the drive unit is driven and the output shaft of the drive unit is rotated in a predetermined direction, the rotation of the output shaft is transmitted to both the first rotation transmission unit and the second rotation transmission unit. The rotation of the output shaft transmitted to the first rotation transmission unit is transmitted to the spool by the first clutch, whereby the spool is rotated in the winding direction.

When the rotation of the output shaft is transmitted to both the first rotation transmission unit and the second rotation transmission unit, the first rotating body of the first clutch is rotated and the second rotating body of the second clutch is rotated. In this state, when the rotation speed of the spool in the winding direction is lower than the rotation speed of the spool in the winding direction when the rotation is transmitted to the spool via the second rotation transmission unit, the rotation speed of the first rotating body of the first clutch is slower than the rotation speed of the second rotating body of the second clutch. As a result, the pressing member provided on the first rotating body presses the coupling member provided on the second rotating body to move the coupling member. As a result, the second rotation transmission unit is coupled to the spool, the rotation of the output shaft is transmitted to the spool via the second rotation transmission unit, and the spool is rotated in the winding direction.

When the second clutch is actuated in this manner, the first clutch is actuated, and the rotation transmission to the spool via the first rotation transmission unit is blocked.

Advantageous Effects of Invention

As described above, in the webbing winding device according to the first aspect of the invention, even in a case in which the rotation direction of the output shaft of the drive unit is not changed, the rotation transmission path can be switched from the first rotation transmission unit to the second rotation transmission unit, and the rotation of the spool in the winding direction can be changed from high speed to low speed, so that the control of the drive unit can be facilitated.

DESCRIPTION OF EMBODIMENTS

Next, an embodiment of the invention will be described with reference to each of FIGS. 1 to 7. An arrow LH appropriately shown in each drawing indicates the left side of a webbing winding device 10, and an arrow UP indicates the upper side of the device. An arrow A indicates the winding direction in the rotation direction of a spool 18.

Configuration of Present Embodiment

Figure 1:
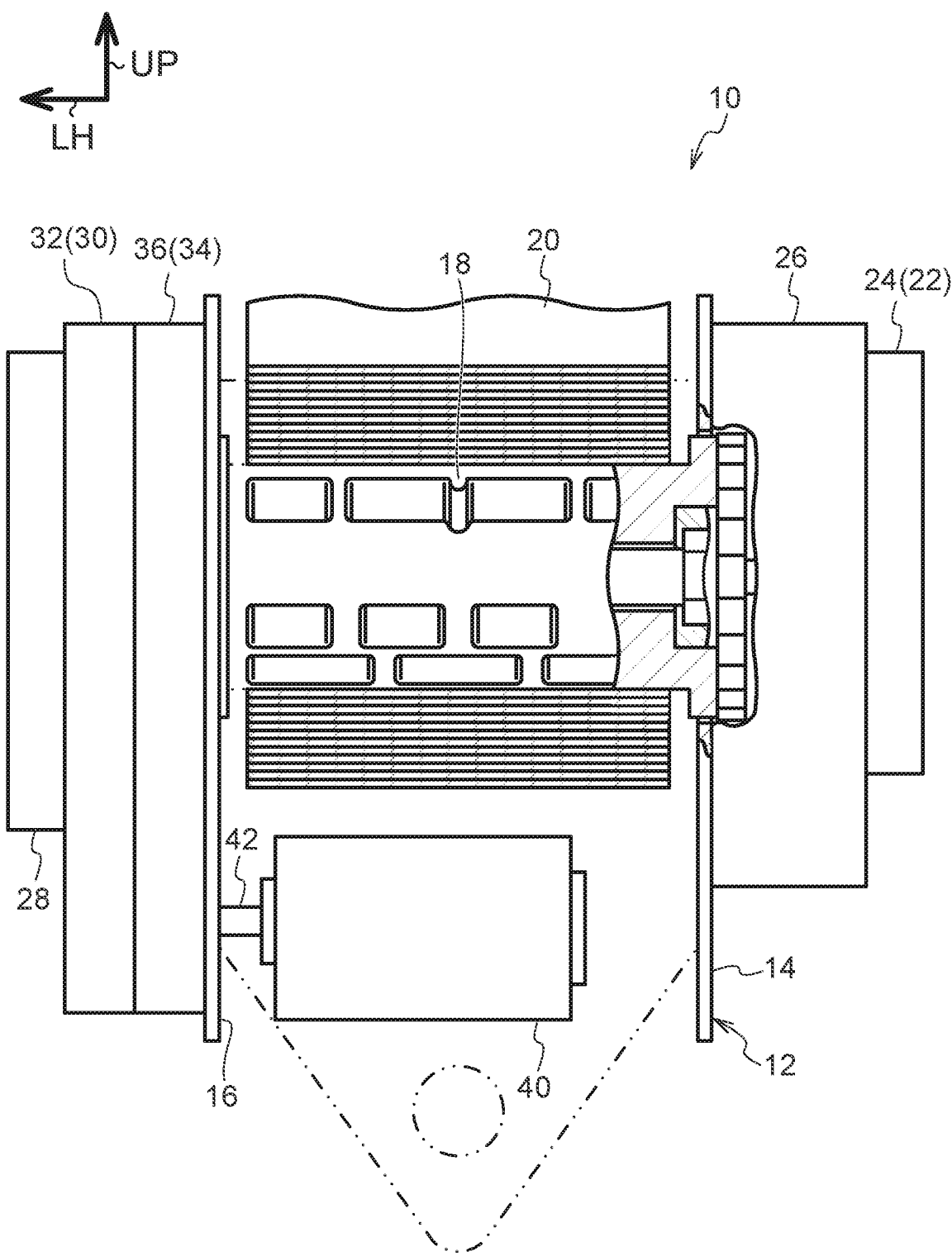
FIG. 1 is a schematic front view of a webbing winding device according to an embodiment of the invention.

As illustrated in FIG. 1, the webbing winding device 10 according to the present embodiment includes a frame 12. The frame 12 is fixed to a vehicle lower portion of a center pillar (not illustrated) as a vehicle body. In addition, the frame 12 includes leg plates 14 and 16, and the leg plate 14 and the leg plate 16 face each other in the device left-right direction (the direction of the arrow LH in FIG. 1 and the direction opposite to it).

The webbing winding device 10 includes the spool 18. The spool 18 is formed in a substantially cylindrical shape and is disposed between the leg plate 14 and the leg plate 16 of the frame 12. The central axis direction of the spool 18 is along a direction in which the leg plate 14 and the leg plate 16 faces (that is, the device left-right direction), and the spool 18 is rotatable around the central axis.

The longitudinal proximal end of a long belt-shaped webbing 20 is locked to the spool 18, and when the spool 18 is rotated in the winding direction (the direction of the arrow A in FIG. 2 and the like), the webbing 20 is wound around the spool 18 from the longitudinal proximal end side. The distal end side of the webbing 20 in the longitudinal direction extends from the spool 18 to the vehicle upper side. The distal end side of the webbing 20 in the longitudinal direction is folded back to the vehicle lower side through a slit hole formed in a through anchor (not illustrated) supported by a center pillar on the vehicle upper side of the frame 12.

The distal end of the webbing 20 in the longitudinal direction is locked to an anchor plate (not illustrated). The anchor plate is formed of a metal plate material such as iron, and is fixed to a floor portion (not illustrated) of the vehicle, a frame member of a sheet (not illustrated) corresponding to the webbing winding device 10, or the like.

The vehicle seat belt device to which the webbing winding device 10 is applied includes a buckle device (not illustrated). The buckle device is provided on the inner side in the vehicle width direction of the seat to which the webbing winding device 10 is applied. In a state where the webbing 20 is hung around the body of the occupant seated on the seat, a tongue (not illustrated) provided on the webbing 20 is engaged with the buckle device, whereby the webbing 20 is attached to the body of the occupant.

In addition, a lock mechanism 22 as a lock unit is provided on the device right side of the leg plate 14 (opposite to the direction of the arrow LH in FIG. 1). The lock mechanism 22 actuates, for example, in at least one of a case in which the vehicle is suddenly decelerated and a case in which the spool 18 is suddenly rotated in the pull-out direction. When the lock mechanism 22 actuates, the rotation of the spool 18 in the pull-out direction is directly or indirectly restricted, and the pull-out of the webbing 20 from the spool 18 is restricted.

A pretensioner 26 is provided on the device right side of the leg plate 14. The pretensioner 26 is actuated in a vehicle emergency such as a vehicle collision. When the pretensioner 26 is actuated, the spool 18 is forcibly rotated in the winding direction (the direction of the arrow A in FIG. 2 and the like). The spool 18 is provided with a force limiter mechanism. When the rotational force of the spool 18 in the pull-out direction exceeds a predetermined magnitude in a state where the spool 18 is prevented from rotating in the pull-out direction (the direction opposite to the direction of the arrow A in FIG. 2 and the like) by the lock member of the lock mechanism 22, the spool 18 is rotated in the pull-out direction while the energy absorbing member of the force limiter mechanism is deformed. The webbing 20 is pulled out from the spool 18 by the rotation amount of the spool 18 in the pull-out direction, and part of the rotational force of the spool 18 is used for deformation of the energy absorbing member and absorbed.

A spring housing 28 is provided on the device left side (the arrow LH direction in FIG. 1) of the leg plate 16 of the frame 12, and a spiral spring (not illustrated) as a spool biasing unit is provided inside the spring housing 28. The volute outer end of the spiral spring in the spring housing 28 is directly or indirectly locked to the spring housing 28. A shaft member (not shown) is provided inside the spring housing 28, and the volute inner end of the spiral spring is directly or indirectly locked to the shaft member.

The shaft member in the spring housing 28 is disposed coaxially with the spool 18 and is rotatably supported by the spring housing 28. The shaft member in the spring housing 28 is indirectly coupled to the spool 18, and the relative rotation with respect to the spool 18 is restricted. Therefore, the spool 18 is biased in the winding direction (the direction of the arrow A in FIG. 2 and the like) by the spiral spring in the spring housing 28.

Figure 2:
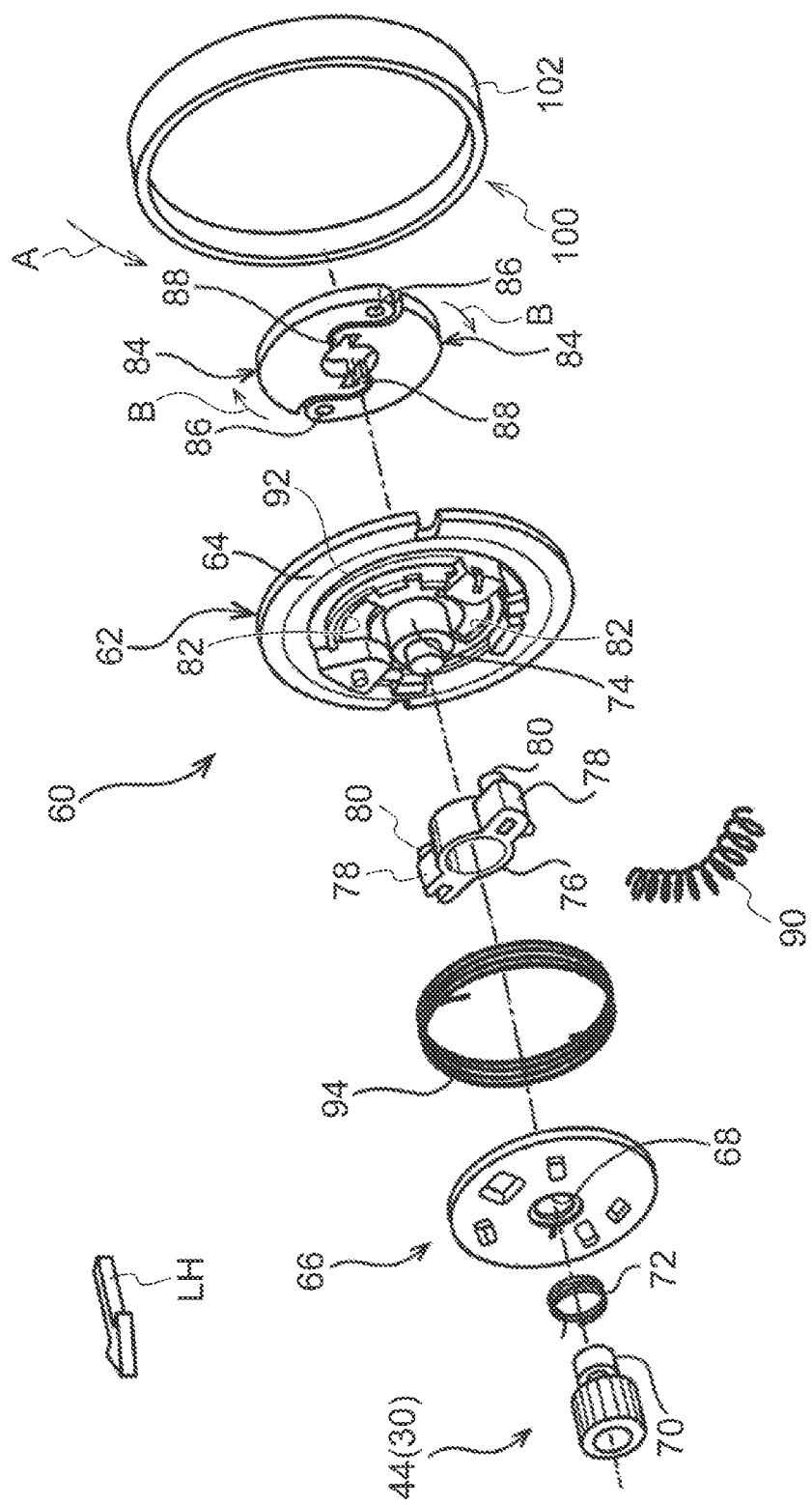
FIG. 2 is an exploded perspective view illustrating a configuration of a first clutch.

A first gear housing 32 of a first gear train 30 as a first rotation transmission unit is provided between the spring housing 28 and the leg plate 16 of the frame 12. A second gear housing 36 of a second gear train 34 as a second rotation transmission unit is provided between the first gear housing 32 and the leg plate 16 of the frame 12. The first gear train 30 including a first gear train final gear 44 illustrated in FIG. 2 is provided inside the first gear housing 32. On the other hand, the second gear train 34 including a second gear train final gear 46 as a second rotating body illustrated in FIG. 5 and the like is provided inside the second gear housing 36.

As illustrated in FIG. 1, the webbing winding device 10 includes a motor 40 as a drive unit. The motor 40 is provided on the device lower side (opposite to the arrow UP direction in FIG. 1) of the spool 18 between the leg plate 14 and the leg plate 16 of the frame 12. The motor 40 is electrically connected to an ECU (not shown) as a control unit electrically connected to a battery (not shown) mounted on the vehicle. The ECU is electrically connected to a front monitoring device (not illustrated) that monitors the front of the vehicle.

In the front monitoring device, for example, when a radio wave such as a millimeter wave radar emitted ahead of the vehicle is reflected by an obstacle or the like ahead of the vehicle, the radio wave is received by the front monitoring device, and the distance from the vehicle to the obstacle ahead of the vehicle is calculated by the front monitoring device. In a case in which the distance calculated in this manner from the vehicle to the obstacle ahead of the vehicle is less than the predetermined value, the obstacle detection signal output from the front monitoring device to the ECU is switched from the Low level to the High level. When the obstacle detection signal input to the ECU is switched from the Low level to the High level, the motor 40 is driven to rotate forward by the ECU.

The ECU is electrically connected to a buckle switch (not shown). The buckle switch is provided in the above-described buckle constituting the seat belt device, and when the tongue is engaged with the buckle, the tongue detection signal output from the buckle switch to the ECU is switched from the Low level to the High level. On the other hand, when the engagement between the tongue and the buckle is released, the tongue detection signal output from the buckle switch is switched from the High level to the Low level. When the tang detection signal input to the ECU is switched from one of the Low level and the High level to the other, the motor 40 is driven to rotate forward by the ECU.

An output shaft 42 of the motor 40 extends from the main body of the motor 40 to the device left side (the arrow LH direction in FIG. 1), and the output shaft 42 of the motor 40 enters the first gear housing 32 and the second gear housing 36 through the leg plate 14 of the frame 12. In the output shaft 42 of the motor 40, a drive gear (not illustrated) is provided integrally with the output shaft 42 coaxially with the output shaft 42. The drive gear of the output shaft 42 of the motor 40 meshes with a first gear train initial stage gear (not illustrated) of the first gear train 30 in the first gear housing 32.

Therefore, the driving force (that is, the rotational force of the output shaft 42) of the motor 40 is transmitted to the first gear train initial stage gear of the first gear train 30, and the first gear train initial stage gear is rotated. The driving force of the motor 40 transmitted to the first gear train initial stage gear of the first gear train 30 is transmitted to the first gear train final gear 44 of the first gear train 30 while being decelerated by the first gear train 30. As a result, the first gear train final gear 44 can rotate.

The drive gear of the output shaft 42 of the motor 40 meshes with a second gear train initial stage gear (not illustrated) of the second gear train 34 inside the second gear housing 36. Therefore, the driving force (that is, the rotational force of the output shaft 42) of the motor 40 is transmitted to the second gear train initial stage gear of the second gear train 34, and the second gear train initial stage gear is rotated. The driving force of the motor 40 transmitted to the second gear train initial stage gear of the second gear train 34 is transmitted to the second gear train final gear 46 of the second gear train 34 while being decelerated by the second gear train 34. As a result, the second gear train final gear 46 can rotate.

That is, in the present embodiment, when the motor 40 is driven and the output shaft 42 is rotated, both the first gear train final gear 44 of the first gear train 30 and the second gear train final gear 46 of the second gear train 34 are rotated in the same direction. Here, both the first gear train final gear 44 of the first gear train 30 and the second gear train final gear 46 of the second gear train 34 are provided coaxially with respect to the spool 18. The reduction ratio of the second gear train 34 is larger than the reduction ratio of the first gear train 30. Therefore, when the motor 40 is driven to rotate forward and the output shaft 42 is rotated, the first gear train final gear 44 of the first gear train 30 is rotated in the winding direction, and is rotated in the winding direction at a higher speed than the second gear train final gear 46 of the second gear train 34.

The first gear train 30 in the first gear housing 32 includes a first clutch 60 illustrated in FIG. 2. The first clutch 60 includes a base 62. The base 62 includes a disk portion 64. A rotor plate 66 is provided on the device left side (the arrow LH direction in FIG. 2) of the disk portion 64. The rotor plate 66 has a disk shape and is provided coaxially with the disk portion 64. The rotor plate 66 is coupled to the disk portion 64 at a position away from the disk portion 64 toward the device left side, and relative rotation with respect to the disk portion 64 and relative movement in the device left-right direction are restricted.

A support hole 68 is formed substantially at the center of the rotor plate 66. A gear shaft portion 70 of the first gear train final gear 44 of the first gear train 30 is inserted into the support hole 68 of the rotor plate 66, and the first gear train final gear 44 is relatively rotatably supported by the rotor plate 66 coaxially with the rotor plate 66.

The gear shaft portion 70 of the first gear train final gear 44 is provided with a first clutch spring 72. The first clutch spring 72 is a coil spring, and the gear shaft portion 70 of the first gear train final gear 44 is disposed inside the first clutch spring 72. When the first gear train final gear 44 is rotated in the winding direction (the direction of the arrow A in FIG. 2), the friction between the gear shaft portion 70 of the first gear train final gear 44 and the first clutch spring 72 rotates the first clutch spring 72 together with the first gear train final gear 44 in the winding direction. One end of the first clutch spring 72 is engaged with the rotor plate 66. As a result, the rotational force of the first gear train final gear 44 is transmitted to the rotor plate 66 via the first clutch spring 72 and further transmitted to the base 62.

A base shaft portion 74 is provided on the device left side (arrow LH direction in FIG. 2) of the disk portion 64 of the base 62. The base shaft portion 74 is formed in a columnar shape, is disposed coaxially with the spool 18, and is integrated with the disk portion 64. The base shaft portion 74 is provided with a lever 76, and the lever 76 is turnably supported by the base shaft portion 74 in a winding direction (the direction of the arrow A in FIG. 2) and a pull-out direction (the direction opposite to the direction of the arrow A in FIG. 2). The lever 76 is provided with a pair of lever portions 78.

One of the lever portions 78 is disposed radially outward of a ring portion 92, and the other of the lever portions 78 is disposed opposite the one lever portion 78 across the turning center of the lever 76. An engagement protrusion 80 protrudes from each of both lever portions 78 of the lever 76 toward the device right side (the direction opposite to the direction of the arrow LH in FIG. 2). These engagement protrusions 80 pass through holes 82 formed in the disk portion 64 of the base 62 and protrude to the device right side of the disk portion 64.

A pair of weights 84 is provided on the device right side of the disk portion 64 of the base 62. Holes 86 are formed in these weights 84. The hole 86 penetrates the weight 84 in the device left-right direction (the direction of the arrow LH in FIG. 2 and the direction opposite to it). A support shaft (not illustrated) formed to protrude from the device right side face of the disk portion 64 of the base 62 is inserted into the hole 86, and each weight 84 is turnably supported by the support shaft in a direction around an axis with the device left-right direction as an axial direction. Engagement claws 88 are formed on the respective weights 84.

The engagement claw 88 of one weight 84 is engaged with the engagement protrusion 80 of one lever portion 78 of the lever 76, and the engagement claw 88 of the other weight 84 is engaged with the engagement protrusion 80 of the other lever portion 78 of the lever 76. When the weight 84 is turned in one direction (the direction of the arrow B in FIG. 2) around the support shaft formed in the disk portion 64 of the base 62, the engagement protrusions 80 of both lever portions 78 of the lever 76 are pulled by the engagement claws 88 of the weight 84, whereby the lever 76 is turned in the pull-out direction.

The base 62 is provided with a return spring 90. The return spring 90 is a compression coil spring, and is disposed on the device right side (the direction opposite to the direction of the arrow LH in FIG. 2) of the disk portion 64 of the base 62. One end of the return spring 90 is engaged with one lever portion 78 of the lever 76, and the other end of the return spring 90 is engaged with the base 62. As a result, the lever 76 is biased toward the winding direction (the direction of the arrow A in FIG. 2) with respect to the disk portion 64 of the base 62, and resists the biasing force of the return spring 90, so that it can rotate in the pull-out direction opposite to the winding direction with respect to the disk portion 64 of the base 62 by.

A spring mounting portion 92 is formed on the disk portion 64 of the base 62. The spring mounting portion 92 has a substantially disk shape having a diameter smaller than that of the disk portion 64, and is formed integrally with the disk portion 64 coaxially with the disk portion 64 on the device left side of the disk portion 64. The spring mounting portion 92 of the disk portion 64 of the base 62 is provided with a second clutch spring 94. The second clutch spring 94 is a torsion coil spring, and the spring mounting portion 92 is inside the second clutch spring 94. As a result, the second clutch spring 94 is held by the spring mounting portion 92.

One end of the second clutch spring 94 is locked to one of the pair of lever portions 78 of the lever 76. On the other hand, the other end of the second clutch spring 94 is locked to the disk portion 64 of the base 62. Therefore, when the lever 76 is turned in the pull-out direction (the direction opposite to the direction of the arrow A in FIG. 2) with respect to the base 62, the coil portion of the second clutch spring 94 is elastically deformed so as to bulge radially outward of the coil portion.

A slider base 100 as a first rotating body of the first rotation transmission unit is provided radially outside the coil portion of the second clutch spring 94. The slider base 100 includes a ring portion 102. The ring portion 102 of the slider base 100 is disposed coaxially with the base 62, and is supported by the base 62 so as to be rotatable relative to the base 62.

However, as described above, when the coil portion of the second clutch spring 94 provided in the base 62 is elastically deformed so as to bulge (displace) radially outward of the coil portion, the second clutch spring 94 is brought into pressure contact with the inner portion of the ring portion 102 of the slider base 100. In this state, the friction between the second clutch spring 94 and the inner portion of the slider base 100 transmits the rotation of the base 62 to the slider base 100. As a result, the slider base 100 is rotated.

That is, when the output shaft 42 when the motor 40 is driven to rotate forward is transmitted to the first gear train final gear 44 of the first gear train 30, and the first gear train final gear 44 is rotated in the winding direction, the slider base 100 is rotated in the winding direction. However, when the rotation of the slider base 100 in the winding direction is restricted in the rotation state of the first gear train final gear 44 in the winding direction, the coil portion of the second clutch spring 94 slides in the winding direction with respect to the inner portion of the slider base 100. As a result, transmission of rotation from the coil portion of the second clutch spring 94 to the slider base 100 in the winding direction is blocked.

Figure 5:
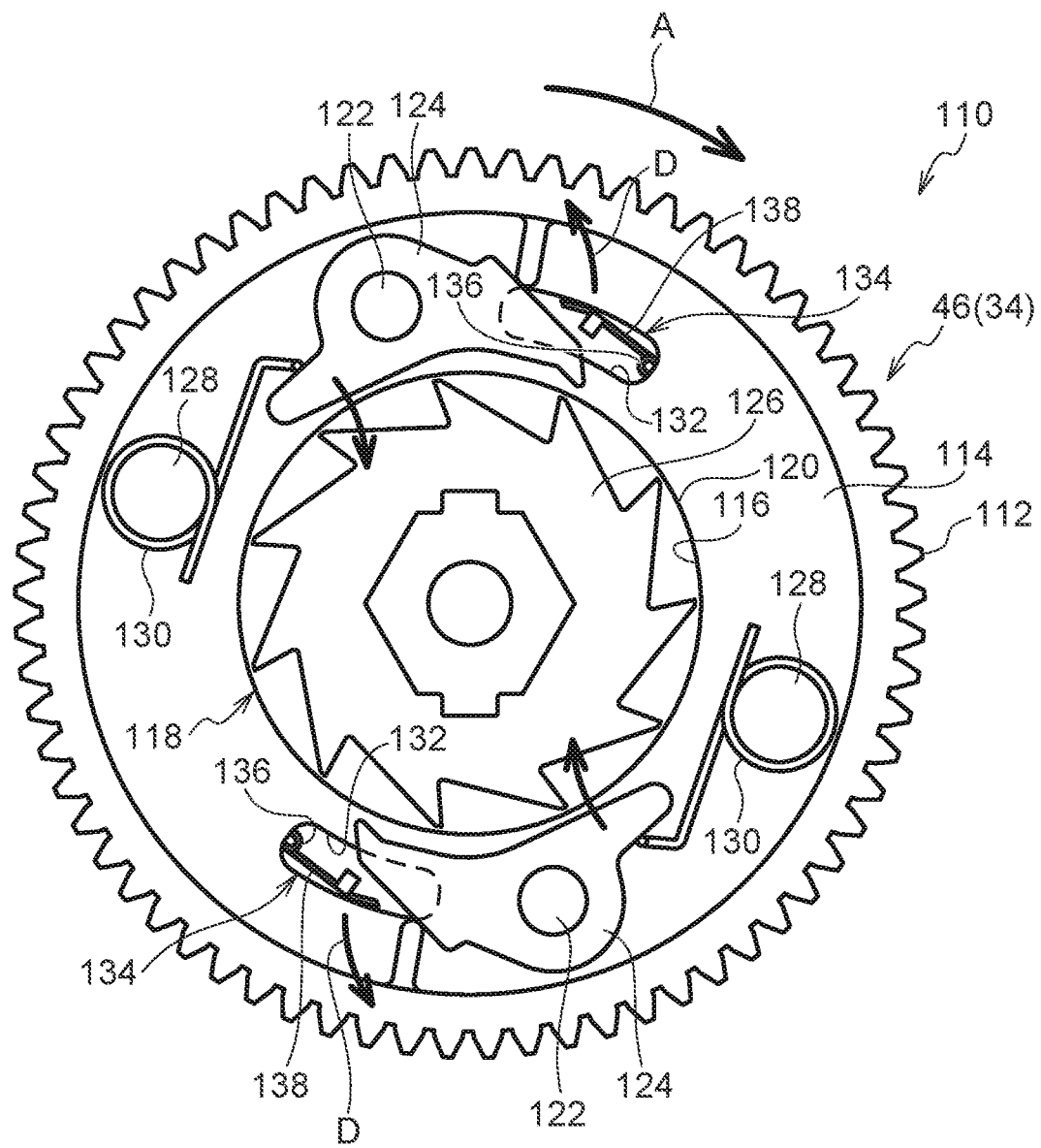
FIG. 5 is a side view of a second clutch when viewed from the right side of the device.

The second gear train final gear 46 of the second gear train 34 constitutes a second clutch 110 as a second rotating body illustrated in FIG. 5. The second gear train final gear 46 is provided coaxially with the spool 18. In addition, the second gear train final gear 46 includes a gear portion 112 with external teeth and a bottom wall portion 114 provided inside the gear portion 112, and has a shallow bottomed cylindrical shape opened toward the right side of the device as a whole. The gear portion 112 meshes with a front stage gear (not shown) of the second gear train final gear 46 in the second gear train 34, and when the rotation of the output shaft 42 of the motor 40 is transmitted to the second gear train 34, the gear portion 112, that is, the second gear train final gear 46, is rotated.

A circular hole 116 is formed in the bottom wall portion 114 of the second gear train final gear 46. The circular hole 116 is circular and is formed coaxially with the spool 18. The shaft portion 120 of the coupling portion 118 is disposed to pass through the circular hole 116. The shaft portion 120 of the coupling portion 118 has a cylindrical shape, and the second gear train final gear 46 is rotatably supported by a shaft portion 120 of the coupling portion 118. The portion of the shaft portion 120 of the coupling portion 118 on the device left side (the direction of the arrow LH in FIG. 1 and the like) is coupled to the slider base 100 of the first clutch 60. The relative rotation of the first clutch 60 with respect to the slider base 100 in the winding direction (the direction of the arrow A in FIG. 5 and the like) and the pull-out direction (the direction opposite to the direction of the arrow A in FIG. 5 and the like) is restricted in the coupling portion 118.

A pair of pawl support shafts 122 is provided on the bottom wall portion 114 inside the gear portion 112. The axial direction of each pawl support shaft 122 is the same as the central axis direction of the second gear train final gear 46. The pawl support shaft 122 turnably supports a coupling pawl 124 as a coupling member about the pawl support shaft 122.

Figure 6:
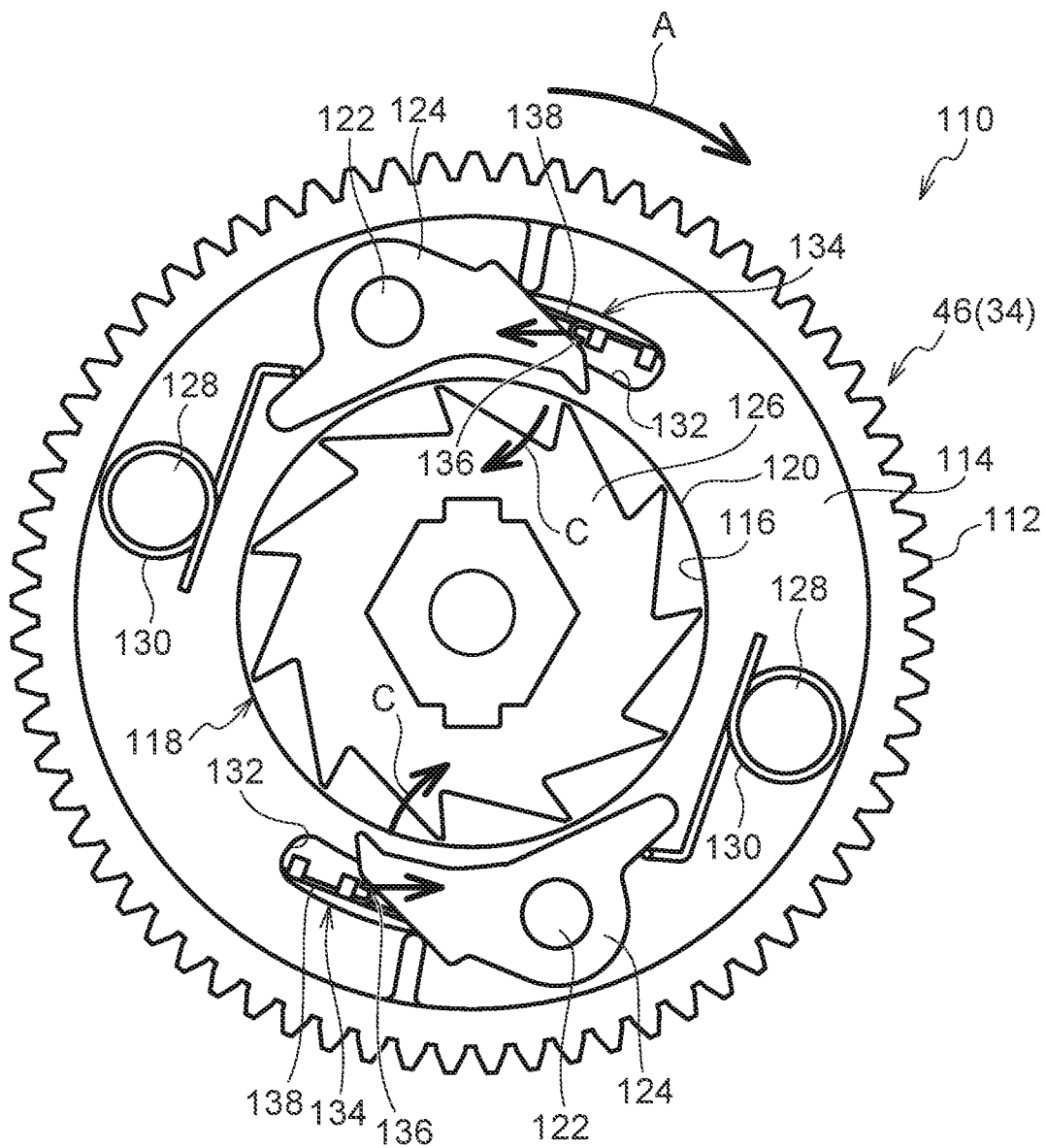
FIG. 6 is a side view corresponding to FIG. 5, illustrating a state in which the slider contacts the coupling pawl.
Figure 7:
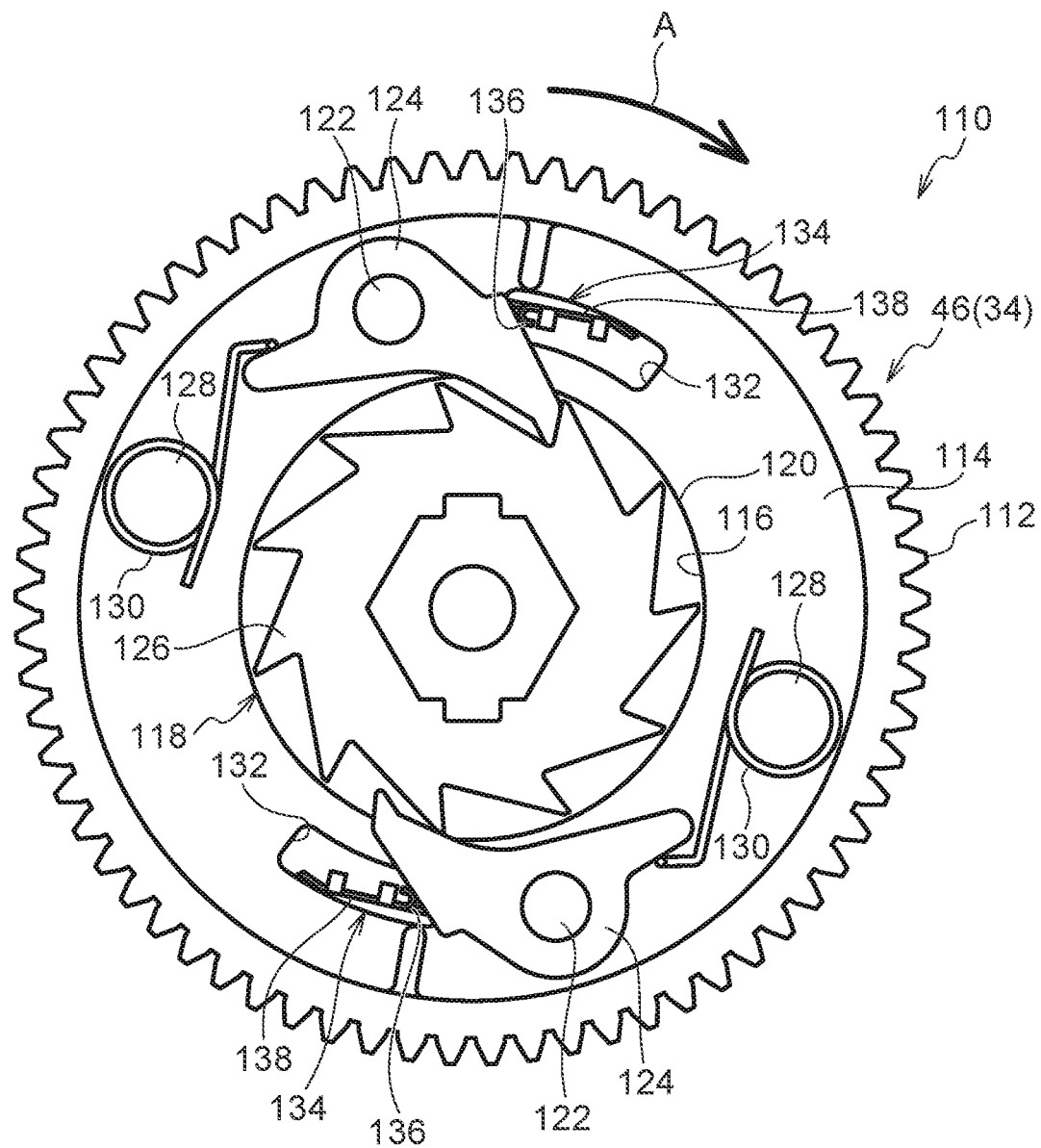
FIG. 7 is a side view corresponding to FIG. 6, showing a state in which the coupling pawl is turned in the coupling direction.

When the coupling pawl 124 is turned in one coupling direction (the direction of the arrow C in FIG. 6) around the pawl support shaft 122, the coupling pawl can mesh with a ratchet gear 126 disposed inside the gear portion 112 of the second gear train final gear 46 (see FIG. 7). In the meshing state of the coupling pawl 124 and the ratchet gear 126, it is possible to transmit the rotation of the second gear train final gear 46 in the winding direction to the ratchet gear 126.

The ratchet gear 126 is provided coaxially with the spool 18 and is integrated with the shaft portion 120 of the coupling portion 118. The ratchet gear 126 is directly or indirectly coupled to the spool 18, and the relative rotation of the ratchet gear 126 with respect to the spool 18 is restricted. Therefore, when the ratchet gear 126 or the slider base 100 of the first clutch 60 is rotated in the winding direction (the direction of the arrow A in FIG. 5 and the like), the rotation is transmitted to the spool 18, and the spool 18 is rotated in the winding direction.

A pair of support pins 128 is provided on the bottom wall portion 114 around the pawl support shaft 122. A pawl return spring 130 is attached to each of the support pins 128. One end of the pawl return spring 130 is brought into pressure contact with the coupling pawl 124, whereby the coupling pawl 124 is biased in a direction (the direction of the arrow D in FIG. 5) opposite to the coupling direction.

Figure 4:
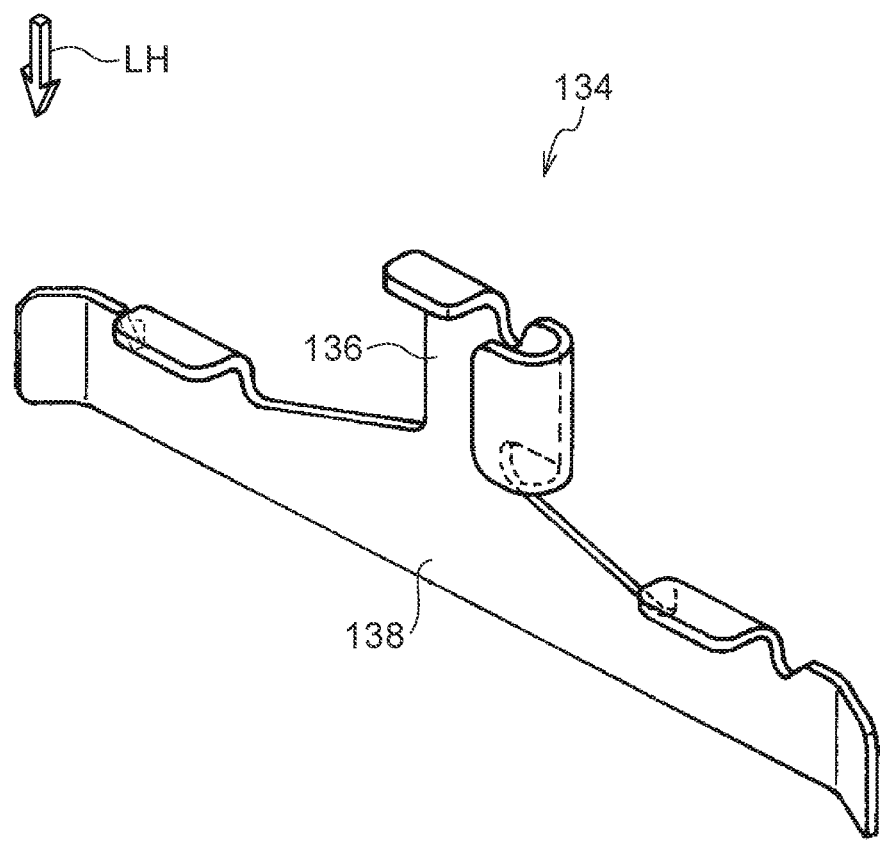
FIG. 4 is a perspective view of a slider.

As illustrated in FIG. 5, a pair of holes 132 is formed in the bottom wall portion 114 of the second gear train final gear 46. A contact portion 136 of the slider 134 as a pressing member is disposed to pass through the hole 132. As shown in FIG. 4, the slider 134 includes a base portion 138. The base portion 138 has a thin plate shape, and the width direction of the base portion 138 is substantially the device left-right direction (the direction of the arrow LH in FIG. 4 and the direction opposite to it).

As illustrated in FIG. 4, the base portion 138 of slider 134 is disposed inside a ring groove 140 formed in the slider base 100 of first clutch 60. The ring groove 140 is formed in a circular shape and is opened to the right side of the device (the direction opposite to the direction of the arrow LH in FIG. 2 and the like), that is, toward the second gear train final gear 46 of the second gear train 34 coaxially with the spool 18. The base portion 138 of the slider 134 is brought into pressure contact with the inner wall of the ring groove 140 and is held by friction between the base portion 138 and the inner wall of the ring groove 140. When the slider 134 is pressed in the circumferential direction or the tangential direction of the ring groove 140 by a force exceeding frictional resistance (maximum frictional force) between the base portion 138 and the inner wall of the ring groove 140, the slider 134 is rotated relative to the slider base 100 in the circumferential direction of the ring groove 140 inside the ring groove 140.

Figure 3:
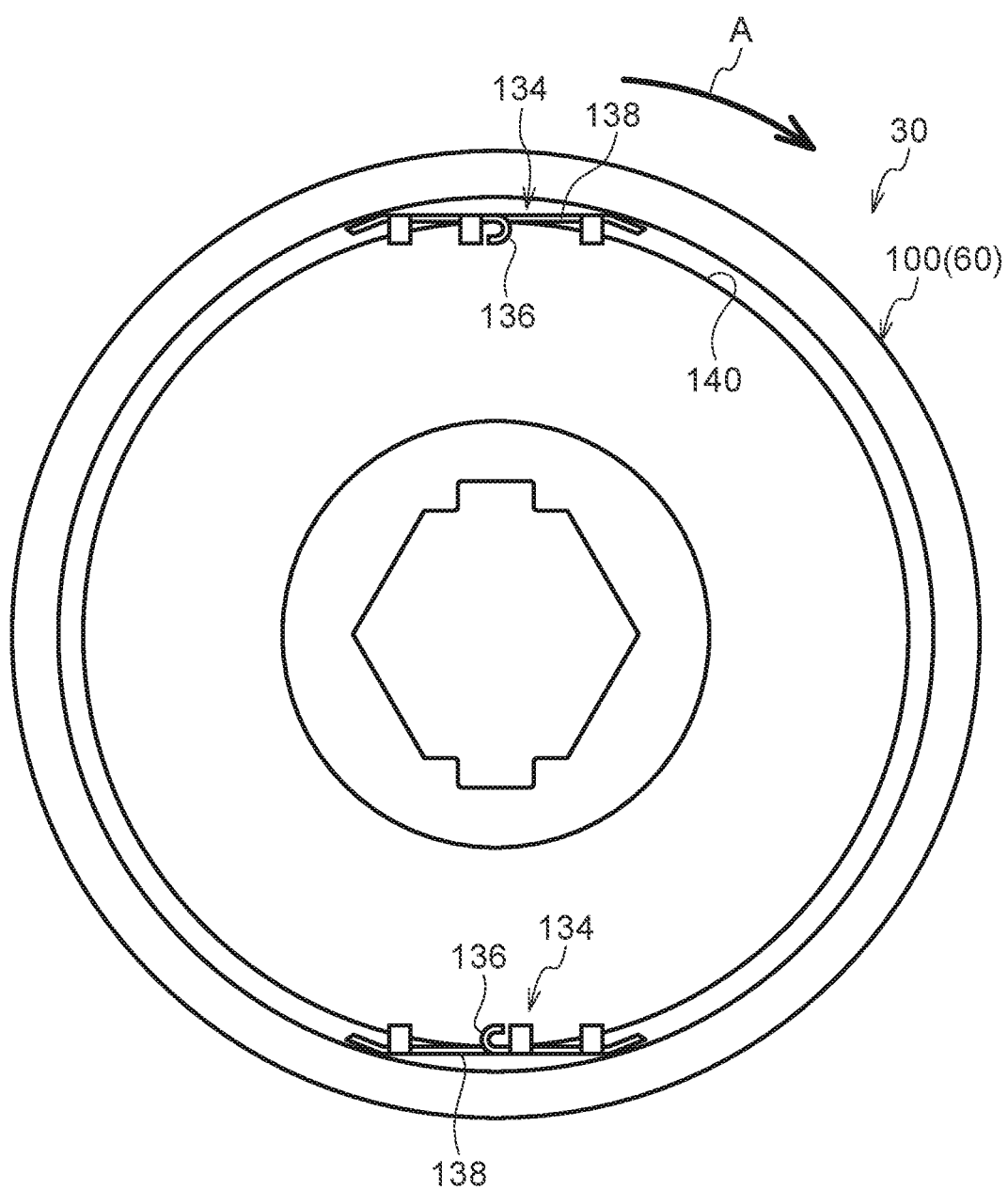
FIG. 3 is a side view of the slide base of the first clutch when viewed from the right side of the device.

As shown in FIG. 3, the contact portion 136 of the slider 134 extends from the longitudinal intermediate portion of the base portion 138 to the device right side. As illustrated in FIG. 5, the contact portion 136 of the slider 134 is disposed at a place toward the winding direction of the coupling pawl 124 (the direction opposite to the direction of the arrow A in FIG. 5 and the like). When the second gear train final gear 46 is rotated relative to the slider 134 in the winding direction, the coupling pawl 124 is brought close to and into contact with the contact portion 136 of the slider 134. In this state, when the coupling pawl 124 presses the contact portion 136 of the slider 134 in the winding direction, the coupling pawl 124 receives a pressing reaction force from the contact portion 136 of the slider 134. When this pressing reaction force exceeds the biasing force, in a direction (the direction of the arrow D in FIG. 5) opposite to the coupling direction, received by the coupling pawl 124 from the above-described pawl return spring 130, the coupling pawl 124 is turned in the coupling direction.

(Operation and Effect of Present Embodiment)

Next, functions and effects of the present embodiment will be described.

In the present exemplary embodiment, when the webbing 20 is attached to a body of an occupant seated on a seat of a vehicle, the webbing 20 is pulled by the occupant, whereby the webbing 20 is pulled out from the spool 18. The webbing 20 pulled out from the webbing 20 is hooked by the occupant to the vehicle front side of the body of the occupant, and in this state, the tongue provided on the webbing 20 is engaged with the buckle of the seat belt device.

When the tang is engaged with the buckle of the seat belt device, the tang detection signal output from the buckle switch provided in the buckle and input to the ECU is switched from the Low level to the High level, and the motor 40 is driven to rotate forward by the ECU, whereby the output shaft 42 of the motor 40 is rotated. The rotation of the output shaft 42 of the motor 40 is decelerated by the first gear train 30 and transmitted to the first gear train final gear 44 of the first gear train 30. As a result, the first gear train final gear 44 is rotated in the winding direction (the direction of the arrow A in FIG. 2 and the like).

The rotation of the first gear train final gear 44 in the winding direction is transmitted to the base 62 via the first clutch spring 72 and the rotor plate 66 of the first clutch 60. Accordingly, the base 62 is rotated in the winding direction. When a centrifugal force is applied to the weight 84 of the first clutch 60 by the rotation of the base 62 in the winding direction, the weight 84 is turned in one direction (the direction of the arrow B in FIG. 2) around the pawl support shaft 122.

When the lever 76 of the first clutch 60 is rotated around the base shaft portion 74 against the biasing force of the return spring 90 by the rotation of the weight 84, the coil portion of the second clutch spring 94 of the first clutch 60 is deformed so as to bulge radially outward, and the second clutch spring 94 is brought into pressure contact with the inner portion of the slider base 100 of the first clutch 60. As a result, the rotation of the first gear train 30 of the first gear train final gear 44 in the winding direction is transmitted to the slider base 100, and the slider base 100 is rotated in the winding direction.

The slider base 100 is directly or indirectly coupled to the spool 18, and the relative rotation with respect to the spool 18 is restricted. Therefore, the rotation of the slider base 100 in the winding direction is transmitted to the spool 18, whereby the spool 18 is rotated in the winding direction. As a result, the webbing 20 is wound around and stored in the spool 18, and for example, the slack of the webbing 20 in the state where the webbing 20 is worn on the body of the occupant can be removed.

When the motor 40 is driven to rotate forward by the ECU, the rotation of the output shaft 42 of the motor 40 is transmitted to the second gear train final gear 46 via the second gear train 34, and the second gear train final gear 46 is rotated in the winding direction. Here, the reduction ratio of the second gear train 34 is larger than the reduction ratio of the first gear train 30. Therefore, the rotation speed of the second gear train final gear 46 in the winding direction in this state is slower than the rotation speed of the first gear train final gear 44 in the winding direction (that is, the rotation speed of the slider base 100 in the winding direction).

Therefore, in this state, the contact portion 136 of the slider 134 contacts the winding direction portion of the inner peripheral portion of the hole 132 of the bottom wall portion 114 of the second gear train final gear 46 (see FIG. 5). The rotation speed of the second gear train final gear 46 is slower than the rotation speed of the slider base 100. Therefore, in this state, the contact portion 136 of the slider 134 contacts the inner peripheral portion of the hole 132 of the bottom wall portion 114, so that the base portion 138 of the slider 134 slides against the inner wall of the ring groove 140 of the slider base 100. As a result, even in a case in which the contact portion 136 of the slider 134 is disposed to pass through the hole 132 of the bottom wall portion 114, both the slider base 100 and the second gear train final gear 46 can rotate.

For example, in a case in which the slack of the webbing 20 attached to the body of the occupant is removed by the transmission of the rotation to the spool 18 via the first gear train 30, and the spool 18 cannot further wind the webbing 20 with the rotational torque of the spool 18 in this state, the rotation speed of the spool 18 in the winding direction decreases, or the spool 18 is stopped. As a result, when the rotation speed of the slider base 100 is slower than the rotation speed of the second gear train final gear 46 of the second gear train 34 or the slider base 100 of the first clutch 60 is stopped, the coupling pawl 124 of the second gear train final gear 46 approaches the contact portion 136 of the slider 134.

As a result, as shown in FIG. 6, when the coupling pawl 124 brought into contact with the contact portion 136 of the slider 134 presses the contact portion 136, the coupling pawl 124 receives a pressing reaction force from the contact portion 136. As a result, when the coupling pawl 124 is turned in the coupling direction (the direction of the arrow C in FIG. 6) against the biasing force from the pawl return spring 130, at least one of the pair of coupling pawls 124 engages with the ratchet gear 126. As a result, the rotation of the second gear train final gear 46 in the winding direction is transmitted to the ratchet gear 126.

Here, the reduction ratio of the second gear train 34 is larger than the reduction ratio of the first gear train 30. Therefore, the rotational torque in the winding direction transmitted from the second gear train final gear 46 to the ratchet gear 126 is larger than the rotational torque in the winding direction transmitted to the slider base 100 of the first clutch 60 via the first gear train 30. The ratchet gear 126 is directly or indirectly coupled to the spool 18, and the relative rotation with respect to the spool 18 is restricted. Therefore, the rotation of the ratchet gear 126 in the winding direction is transmitted to the spool 18.

As a result, the spool 18 is rotated in the winding direction with a rotational torque larger than that of a case in which the rotation of the output shaft 42 of the motor 40 is transmitted to the spool 18 via the first gear train 30. As a result, the slack of the webbing 20 that cannot be removed in a case in which the rotation of the output shaft 42 of the motor 40 is transmitted to the spool 18 via the first gear train 30 can be further removed, and the body of the occupant can be more strongly restrained by the webbing 20. Therefore, for example, in a case in which the vehicle approaches an obstacle in front of the traveling vehicle, the body of the occupant can be strongly restrained by the webbing 20 before the vehicle collides with the obstacle.

In a state where the rotation of the output shaft 42 of the motor 40 is transmitted to the spool 18 via the second gear train 34, the slider base 100 of the first gear train 30 together with the ratchet gear 126 is rotated in the winding direction. Therefore, in this state, the rotation speed of the slider base 100 in the winding direction is faster than the rotation speed of the second clutch spring 94 of the first clutch 60 in the winding direction. As described above, when a difference in rotation speed occurs between the slider base 100 and the second clutch spring 94, the slider base 100 slides on the second clutch spring 94. As a result, the slider base 100 together with the ratchet gear 126 can rotate in the winding direction.

As described above, in the present embodiment, the transmission path of the rotation from the output shaft 42 to the spool 18 can be switched from the first gear train 30 to the second gear train 34 without reversing the rotation of the output shaft 42 of the motor 40. Therefore, it is easy (unnecessary) to control the motor 40 when switching the transmission path of the rotation from the first gear train 30 to the second gear train 34.

Further, the output shaft 42 of the motor 40 is not necessarily reversed when the transmission path of the rotation from the first gear train 30 to the second gear train 34 is switched. Therefore, the transmission path of the rotation from the output shaft 42 to the spool 18 can be quickly switched from the first gear train 30 to the second gear train 34. As a result, it is possible to suppress loosening of the webbing 20 at the time of switching from the first gear train 30 to the second gear train 34.

It is unnecessary to increase or decrease the rotation speed of the output shaft 42 of the motor 40 when switching the transmission path of rotation from the first gear train 30 to the second gear train 34. Therefore, this also facilitates control of the motor 40.

Further, for example, even in a case in which the vehicle approaches an obstacle ahead of the traveling vehicle, the rotation of the output shaft 42 of the motor 40 is transmitted to the spool 18 by the first gear train 30 until the rotation speed of the spool 18 in the winding direction by the rotation transmission via the first gear train 30 is slower than the rotation speed of the second gear train final gear 46 of the second gear train 34. Therefore, for example, as compared with a case in which the spool 18 is rotated in the winding direction only by the second gear train 34 without using the first gear train 30, the body of the occupant can be restrained quickly and strongly by the webbing 20.

The disclosure of Japanese Patent Application No. 2020-053432 filed on Mar. 24, 2020 is incorporated herein by reference in its entirety.

The invention claimed is:

1. A webbing winding device comprising:
   a spool to which a longitudinal proximal end of a long belt-shaped webbing is locked and which winds the webbing from a longitudinal proximal end side of the webbing by rotation in a winding direction;
   a drive unit that is driven to rotate an output shaft;
   a first rotation transmission unit that is coupled to the output shaft, receives input due to rotation of the output shaft, transmits the rotation of the output shaft in a predetermined direction to the spool in a state in which the rotation is transmissible to the spool, and rotates the spool in a winding direction;
   a second rotation transmission unit that is coupled to the output shaft, receives input due to rotation of the output shaft, sets a reduction ratio of rotation of the output shaft from the output shaft to the spool to be larger than a reduction ratio of the first rotation transmission unit, transmits the rotation of the output shaft to the spool in a state in which the rotation is allowed to be transmitted to the spool, and rotates the spool in a winding direction; and
   a switching unit that switches a transmission path of rotation from the output shaft to the spool from the first rotation transmission unit to the second rotation transmission unit in a case in which, in a state in which the rotation of the output shaft of the drive unit in the predetermined direction is transmitted to the spool via the first rotation transmission unit, a rotation speed of the spool due to transmission of rotation via the first rotation transmission unit is lower than a rotation speed of the spool when the rotation is transmitted to the spool via the second rotation transmission unit.

2. The webbing winding device according to claim 1, wherein the switching unit includes:
   a first clutch that transmits rotation of the output shaft in a predetermined direction transmitted to the first rotation transmission unit to the spool and is actuated to block transmission of the rotation from the first rotation transmission unit to the spool, and
   a second clutch that blocks transmission of rotation from the second rotation transmission unit to the spool, that is actuated, in a case in which, in a state in which the rotation of the output shaft of the drive unit in the predetermined direction is transmitted to the spool via the first rotation transmission unit, a rotation speed of the spool due to transmission of rotation via the first rotation transmission unit is lower than a rotation speed of the spool when the rotation is transmitted to the spool via the second rotation transmission unit, to connect the second rotation transmission unit to the spool, that transmits rotation of the output shaft in the predetermined direction to the spool via the second rotation transmission unit, and that further actuates the first clutch.

3. The webbing winding device according to claim 2, wherein:
   the first clutch includes a first rotating body rotated by rotation of the output shaft in the predetermined direction;
   the second clutch includes: a second rotating body that is rotated coaxially with the first rotating body at a rotation speed equal to or lower than a rotation speed of the first rotating body by rotation of the output shaft in the predetermined direction, and a coupling member that is provided on the second rotating body and causes, by a movement of the coupling member, a state where rotation of the second rotating body is allowed to be transmitted to the spool to occur; and
   the webbing winding device includes a pressing member that is provided on the first rotating body so as to be rotatable together with the first rotating body, and presses the coupling member to move the coupling member when a rotation speed of the second rotating body exceeds a rotation speed of the first rotating body.

* * * * *